Jan. 2, 1934.  J. M. LE DUC  1,942,031
SELF LUBRICATING VALVE
Filed Jan. 3, 1933
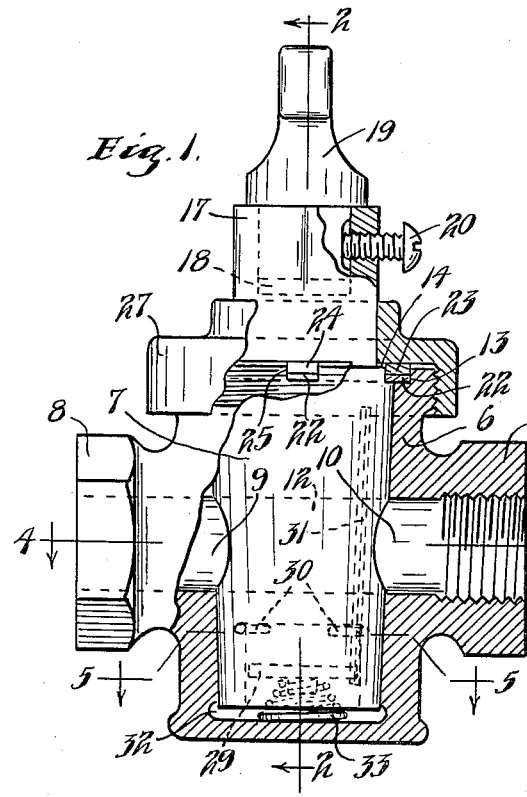
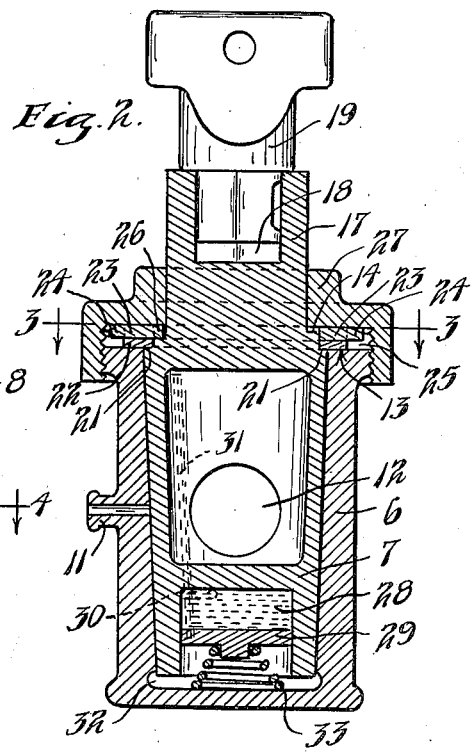
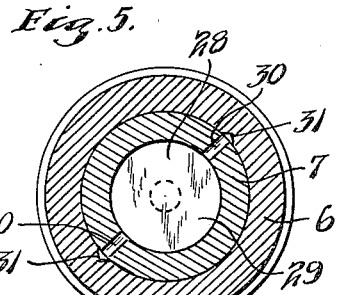
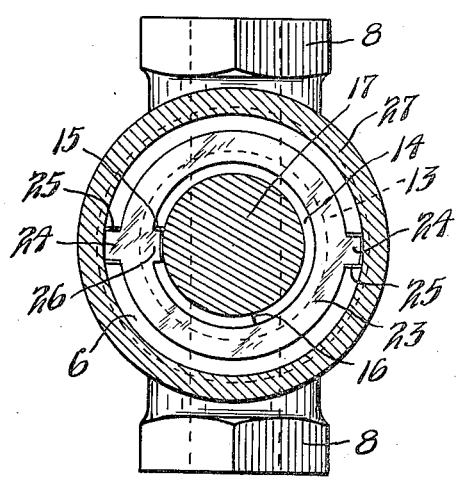
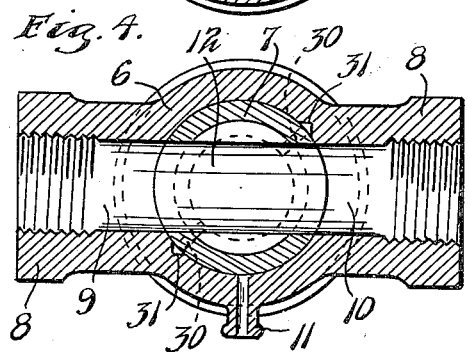
INVENTOR.
JOHN M. LE DUC.
BY HIS ATTORNEYS.
Williamson & Williamson Patented Jan. 2, 1934

1,942,031

UNITED STATES PATENT OFFICE 1,942,031

SELF LUBRICATING VALVE

John M. Le Duc, Minneapolis, Minn.

Application January 3, 1933. Serial No. 649,757

2 Claims. (Cl. 251—93)

This invention relates to valves.

It is one of the objects of the invention to provide a novel and improved self lubricating valve.

It is another object of the invention to provide novel and improved internal stop means in a valve including a body and a rotatable plug fitting therein.

The objects and advantages of the invention will more fully appear from the following description, made in connection with the accompanying drawing, wherein like reference characters refer to the same or similar parts throughout the various views, and, in which, Fig. 1 is a view partly in side elevation and partly in vertical section of a valve embodying the invention;

Fig. 2 is a vertical section taken on the line 2—2 of Fig. 1 as indicated by the arrows;

Fig. 3 is a horizontal section taken on the line 3—3 of Fig. 2, as indicated by the arrows;

Fig. 4 is a horizontal section taken on the line 4—4 of Fig. 1, as indicated by the arrows; and Fig. 5 is a horizontal section taken on the line 5—5 of Fig. 1 as indicated by the arrows.

Referring to the drawing, there is provided in accordance with the present invention a valve body 6 having a central substantially cylindrical portion provided with a vertical bore within which the head of a valve plug 7 fits, said head being of truncated conical shape. This bore in the valve body extends through the top of the body downwardly to a point adjacent the closed bottom of the body. The valve body 6 is also provided with oppositely disposed hexagonal nipples 8 apertured and screw threaded for attachment of pipes and forming inlet and outlet openings 9 and 10 respectively. There is also provided in the valve body 6 intermediate the two openings 9 and 10 a drain-off passage 11. The head of the plug 7 is cored to provide a passage 12 through the plug affording communication between the inlet opening 9 and the outlet opening 10 when the plug 7 is turned to the position illustrated in the drawings. The plug may be turned through 90° in a clockwise direction from the position shown in Figs. 3, 4, and 5, whereupon the plug 7 will prevent communication between the inlet and outlet openings and the passage 12 will then communicate with the drain passage 11 to relieve the pressure within the pipe 12 and allow any liquid trapped therein to drain, so that it may not freeze within the passage.

The upper end of the valve body is provided with an interior rabbet 13 and the head of the valve extends from the bottom of this rabbet downwardly to a point adjacent but spaced from the bottom of the body. A groove 32 is provided in the interior wall of the valve body adjacent the bottom of the same, this groove permitting downward movement of the plug as wear takes place. Above the head of the plug 7, the plug is provided with a flange 14 of somewhat less diameter than the upper part of the head of the plug and this flange terminates in two shoulders 15 and 16 circumferentially spaced apart a distance somewhat greater than 90°. The plug also forms a reduced stem 17 above the head and this stem is provided with a polygonal-shaped recess 18 within which a key 19 fits, the key being preferably held in place as by a set screw 20. The head of the plug 7 by reason of the flange 14 and the stem 17, forms a shoulder 21 at a level even with the bottom of the rabbet 13 in the body. Resting partly on the bottom of the rabbet 13 and partly on the shoulder 21 to seal the joint between the shoulder and the body 6 is a washer 22 preferably of lead. Above this washer there is placed a ring 23 having a pair of diametrically opposed outwardly projecting lugs 24 which are received within notches 25 cut in the upper edge of the body 6, to prevent rotation of the ring 23. This ring 23 also carries an inwardly projecting lug 26 which cooperates with the two shoulders 15 and 16 of the flange 14 to limit possible rotation of the plug relative to the body. When the plug is rotated to the position shown in the drawing, with the passage 12 alined with the inlet and outlet openings 9 and 10 respectively, the shoulder 15 engages the lug 26 to prevent further rotation of the plug in a counterclockwise direction. From this position, the plug may be rotated through 90° in a clockwise direction to close the valve whereupon the shoulder 16 will strike the lug 26 and prevent further rotation in a clockwise direction. It will be seen that the lug 26 cooperating with the two shoulders 15 and 16 form means disposed internally of the valve structure for limiting the movement of the plug.

Above the ring 23, there is provided an apertured cap 27 through the aperture of which the stem 17 extends, and this cap has screw threaded engagement with the upper end of the valve body 6.

The central portion of the lower part of the plug 7 is recessed to form a grease chamber 28 within which grease suitable for valve lubrication will be disposed. A plunger 29 fits within the grease chamber 28 below the grease therein and a conical coil spring 33 reacts between the bottom of the body 6 and the plunger 29 to urge the plunger upwardly. The plunger is provided with a central downwardly projecting spring centering lug. From the grease chamber 28 two diametrically opposed grease ducts 30 project through the plug to the exterior surface thereof and the outlets of these ducts terminate approximately 45° circumferentially taken in a counterclockwise direction, as viewed in Fig. 4, from the axial center line of the passage 12. Longitudinal grooves 31 are cut in the internal wall of the body and these grooves aline with the outlets of the ducts 30 when the passage 12 is alined with the inlet and outlet openings 9 and 10 respectively as best shown in Figs. 4 and 5. The grooves 31 terminate somewhat short of the shoulder 21 and somewhat short of the groove 14.

Although the operation of the valve is probably obvious from the above description, it may be briefly summarized as follows:—

The grease chamber 28 will, of course, be filled with grease prior to the time that the plug 7 is inserted in place within the valve body. The spring 33 will exert resilient pressure on the plunger 29 to force grease from the chamber 28 through the ducts 30 into the grooves 31 when the valve is open. Accordingly, these grooves will be constantly filled with grease. As the plug 17 is turned to close the valve in a clockwise direction as viewed in Figs. 3, 4 and 5, the exterior walls of the plug will be lubricated by the grease in the grooves 31 and will, in turn, lubricate the internal walls of the body 6. The valve, accordingly, is self lubricating. The lug 26 cooperating with the shoulders 15 and 16 act as stops to limit the possible movement of the plug relative to the body so that the plug cannot be turned past a full open position or a full closed position. As the ring 23 is retained by the lugs 24 in fixed position, this ring cannot rotate to unloosen the cap 27 as the plug is turned. The washer 22, however, can freely rotate relative to the ring 23 and to the valve body. Accordingly, the upper end of the valve is properly closed and packed at all times without necessitating repair or adjustment of the parts.

It will be seen that an exceedingly simple and efficient valve has been provided. This valve has been successfully demonstrated in actual practice. The valve although particularly adapted for use in connection with municipal water and gas lines where valves are located under ground and cannot be readily removed for repair or lubrication, is, of course, capable of use wherever a valve may be required.

It will, of course, be understood that various changes may be made in the form, details, arrangement and proportions of the various parts without departing from the scope of the present invention.

What is claimed is:—

1. A valve comprising a body having inlet and outlet openings, a plug rotatably mounted within said body and having a passage extending therethrough for communicating said two openings when said plug is turned to one position, said plug closing off communication between said two openings when it is turned to a second position, a grease chamber in the bottom of said plug, ducts leading from said grease chamber and having outlets on the exterior surface of said plug, said body having grooves cut in its internal walls with which the outlets of said ducts are adapted to aline when said plug is turned to a certain position relative to said body and mechanical means urging the grease from said chamber through said ducts.

2. A valve comprising a body having inlet and outlet openings, a plug rotatably mounted within said body and having a passage extending therethrough for communicating said two openings when said plug is turned to one position, said plug closing off communication between said two openings when it is turned to a second position, a grease chamber in the bottom of said plug, a spring pressed plunger fitting within said grease chamber, and ducts leading from said grease chamber to the exterior surface of said plug, said body having grooves cut in its internal face with which the outlets of said ducts are adapted to aline when said plug is turned to a certain position relative to said body.

JOHN M. LE DUC.